(12) United States Patent
McKinney et al.

(10) Patent No.: US 12,252,184 B2
(45) Date of Patent: *Mar. 18, 2025

(54) TRUCK BODY ASSEMBLY AND METHODS OF MAKING AND USING SAME

(71) Applicant: Altec Industries, Inc., Birmingham, AL (US)

(72) Inventors: Ryan J. McKinney, Parkville, MO (US); Austin Graham, Saint Joseph, MO (US); Kyle E. Hoffmann, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/233,138

(22) Filed: Aug. 11, 2023

(65) Prior Publication Data

US 2023/0382470 A1    Nov. 30, 2023

Related U.S. Application Data

(63) Continuation of application No. 17/193,727, filed on Mar. 5, 2021, now Pat. No. 11,724,751, which is a
(Continued)

(51) Int. Cl.
*B62D 33/023* (2006.01)
*B60R 9/02* (2006.01)
(Continued)

(52) U.S. Cl.
CPC ............... *B62D 33/02* (2013.01); *B60R 9/02* (2013.01); *B60R 11/06* (2013.01); *B60R 13/01* (2013.01);
(Continued)

(58) Field of Classification Search
CPC ... B60R 9/02; B60R 11/06; B60R 2011/0094; B60R 13/01; B60R 13/013; B62D 33/02;
(Continued)

(56) References Cited

U.S. PATENT DOCUMENTS 3,635,536 A    1/1972   Lackey et al.
4,126,349 A  * 11/1978  Nelson ................... B62D 33/02
                                                        224/404
(Continued)

OTHER PUBLICATIONS

U.S. Appl. No. 18/224,907 Non-Final Office Action issued Feb. 8, 2024.
(Continued)

*Primary Examiner* — Gregory A Blankenship
(74) *Attorney, Agent, or Firm* — Erise IP, P.A.

(57) ABSTRACT

An assembly for utility truck bodies having metal and/or composite reinforcement(s) and/or foam reinforcements and/or honeycomb reinforcement/and/or wood reinforcements encapsulated within a thermoformed thermoplastic, or thermoset or fiber-reinforced thermoset walking surface floor structure of the truck bed assembly or other composite floor structure with attachable components and junctions, e.g., sidepack(s), and methods of making the same are provided.

20 Claims, 17 Drawing Sheets

Related U.S. Application Data continuation of application No. 16/138,394, filed on Sep. 21, 2018, now Pat. No. 10,940,899, which is a continuation-in-part of application No. 15/441,612, filed on Feb. 24, 2017, now Pat. No. 10,112,656, which is a continuation of application No. 14/728,307, filed on Jun. 2, 2015, now Pat. No. 9,604,677.

(60) Provisional application No. 62/012,025, filed on Jun. 13, 2014.

(51) Int. Cl.
| | | |
|---|---|---|
| *B60R 11/06* | (2006.01) | |
| *B60R 13/01* | (2006.01) | |
| *B62D 25/20* | (2006.01) | |
| *B62D 29/04* | (2006.01) | |
| *B62D 33/02* | (2006.01) | |
| *B62D 35/00* | (2006.01) | |
| *B60R 9/00* | (2006.01) | |
| *B62D 29/00* | (2006.01) | |

(52) U.S. Cl.
CPC ......... *B62D 25/2054* (2013.01); *B62D 29/04* (2013.01); *B62D 29/043* (2013.01); *B62D 33/023* (2013.01); *B62D 35/00* (2013.01); *B60R 9/00* (2013.01); *B62D 29/00* (2013.01); *B62D 29/041* (2013.01)

(58) Field of Classification Search
CPC .. B62D 33/023; B62D 25/2054; B62D 29/04; B62D 29/041
See application file for complete search history.

(56) References Cited

U.S. PATENT DOCUMENTS

| | | | | |
|---|---|---|---|---|
| 4,976,490 | A | * | 12/1990 | Gentle ................ B62D 29/004 296/183.1 |
| 5,421,645 | A | * | 6/1995 | Young .................... B60R 11/06 296/37.6 |
| 5,823,598 | A | * | 10/1998 | Clare ...................... B60J 10/60 92/144 |
| 5,979,973 | A | | 11/1999 | Clare et al. |
| 6,033,002 | A | | 3/2000 | Clare et al. |
| 6,089,639 | A | * | 7/2000 | Wojnowski ............ B62D 33/02 296/37.6 |
| 6,099,070 | A | * | 8/2000 | Yocum ................ B62D 33/042 296/193.04 |
| 6,131,981 | A | * | 10/2000 | Finley ...................... B60R 9/00 312/348.3 |
| 6,237,211 | B1 | * | 5/2001 | Clare ...................... B60R 11/06 29/469 |
| 6,786,532 | B2 | * | 9/2004 | McNally ................... B60P 3/14 16/229 |
| 6,941,654 | B1 | * | 9/2005 | Sears ....................... B21D 5/00 296/37.6 |
| 6,955,385 | B1 | * | 10/2005 | Boyer .................... B62D 33/02 296/37.6 |
| 7,575,264 | B1 | * | 8/2009 | Solomon ............ B62D 25/2054 296/183.1 |
| 7,823,948 | B2 | * | 11/2010 | Redman .................. B60R 11/06 224/404 |
| 8,691,038 | B2 | * | 4/2014 | Polk, Jr. .................. B29C 48/07 156/244.14 |
| 9,604,677 | B2 | * | 3/2017 | McKinney ............... B60R 9/02 |
| 10,112,656 | B2 | * | 10/2018 | McKinney ............... B60R 9/02 |
| 10,940,899 | B2 | * | 3/2021 | McKinney ............... B60R 13/01 |
| 11,208,156 | B2 | * | 12/2021 | McKinney ............... B60R 13/01 |
| 11,305,823 | B2 | * | 4/2022 | McKinney ............... B60R 11/06 |
| 11,724,751 | B2 | * | 8/2023 | McKinney ................ B60R 9/02 296/180.1 |
| 11,834,103 | B2 | | 12/2023 | McKinney et al. |
| 11,926,366 | B2 | | 3/2024 | McKinney et al. |
| 11,970,139 | B2 | | 4/2024 | Salter et al. |
| 2001/0013709 | A1 | | 8/2001 | Clare et al. |
| 2001/0038230 | A1 | * | 11/2001 | Clare ...................... B60R 11/06 296/37.6 |
| 2005/0225111 | A1 | * | 10/2005 | Boyer .................... B62D 65/02 296/37.6 |
| 2007/0046056 | A1 | | 3/2007 | Delaney et al. |
| 2007/0085381 | A1 | | 4/2007 | Delaney et al. |
| 2008/0156805 | A1 | | 7/2008 | Perry et al. |
| 2015/0360734 | A1 | * | 12/2015 | McKinney ........... B62D 33/023 296/180.1 |
| 2017/0166263 | A1 | * | 6/2017 | McKinney ........... B62D 29/043 |
| 2018/0208089 | A1 | | 7/2018 | Harris et al. |
| 2019/0023330 | A1 | * | 1/2019 | McKinney ............. B62D 33/02 |
| 2019/0100253 | A1 | * | 4/2019 | McKinney ........... B62D 33/023 |
| 2019/0248424 | A1 | * | 8/2019 | McKinney ................ B60P 3/34 |
| 2021/0188366 | A1 | * | 6/2021 | McKinney ............. B62D 29/04 |
| 2022/0111912 | A1 | * | 4/2022 | McKinney ............. B62D 29/04 |
| 2022/0289116 | A1 | | 9/2022 | Cleaves et al. |
| 2023/0192382 | A1 | | 6/2023 | Searle |
| 2023/0219503 | A1 | | 7/2023 | Eloff et al. |
| 2023/0234657 | A1 | * | 7/2023 | Jacobsma .............. B60G 11/27 |
| 2023/0356786 | A1 | | 11/2023 | McKinney et al. |
| 2023/0382470 | A1 | * | 11/2023 | McKinney ........... B62D 29/043 |
| 2024/0083516 | A1 | | 3/2024 | McKinney et al. |

OTHER PUBLICATIONS

U.S. Appl. No. 18/224,907 Notice of Allowance issued May 9, 2024.

U.S. Appl. No. 18/384,028 Final Office Action issued Dec. 13, 2024.

U.S. Appl. No. 18/384,028 Non-Final Office Action issued Jun. 18, 2024.

* cited by examiner

TRUCK BODY ASSEMBLY AND METHODS OF MAKING AND USING SAME

CROSS-REFERENCE TO RELATED APPLICATIONS

This application is related to and claims priority from the following US patent applications. This application is a continuation of U.S. application Ser. No. 17/193,727, filed Mar. 5, 2021, which is a continuation of U.S. application Ser. No. 16/138,394, filed Sep. 21, 2018, now U.S. Pat. No. 10,940,899, which is a continuation-in-part of U.S. application Ser. No. 15/441,612, filed Feb. 24, 2017, now U.S. Pat. No. 10,112,656, which is a continuation of U.S. application Ser. No. 14/728,307, filed Jun. 2, 2015, now U.S. Pat. No. 9,604,677, which claims the benefit of U.S. Provisional Application No. 62/012,025, filed Jun. 13, 2014, each of which is incorporated herein by reference in its entirety.

BACKGROUND OF THE INVENTION

1. Field of the Invention

The present invention relates to utility trucks, and more particularly, to an assembly for utility truck bodies and/or truck beds.

2. Description of the Prior Art

Generally, the prior art contains truck beds or bodies for use with utility trucks. Further, truck bed liners generally are known to be formed from thermoplastic materials. Truck bed modular components are also known, including a truck bed, trailer, cargo box, and backend. Modular components may be connected to one another by known flexible or removable connectors, such as hinges, fasteners, bolts, and nuts. Representative examples of relevant prior art US patent documents include the following:

U.S. Pat. No. 6,955,385 for Corrosion-resistant body for utility vehicle by inventor Boyer filed Apr. 9, 2004 and issued Oct. 18, 2005 describes a corrosion-resistant utility body comprising a pair of body side storage compartment units adapted to be mounted along rear side portions of a truck chassis and thus form a wheel well; the storage compartment units are formed from metal walls having side openings at the outside, an outer face plate fastened to outer surfaces of the storage compartment assembly and door assemblies connected; weld-free utility body is disclosed because of the use of swage-type fasteners.

U.S. Pat. No. 8,240,732 for Trailer utility box by inventor Bernart filed Jun. 9, 2009 and issued Aug. 14, 2012 discloses a modular storage system for storing items on a trailer having a plurality of containers connected to the inside or outside railing of the trailer, at least one of the containers positioned over a wheel of the trailer and include a wheel well for housing and protecting the wheel; the utility box may be secured with fasteners, such as bolts, screws, nuts, welds, adhesives and the like.

U.S. Pat. No. 6,786,532 for Truck body hinge assembly by inventor McNally filed Jun. 27, 2003 and issued Sep. 7, 2004 discloses a modular, living hinge for the door of a utility truck box. The hinge assembly is mounted inside the utility body of the truck box.

U.S. Pat. No. 7,350,273 for Vehicle body hinge by inventor Skipper filed Oct. 7, 2005 and issued Apr. 1, 2008 is directed to a not-living truck body door hinge U.S. Pat. No. 7,784,885 for Adjustable shelving and storage system for vehicle by inventors Steiger, et al. filed Sep. 28, 2005 and issued Aug. 31, 2010 discusses an adjustable storage system with one or more adjustable storage units, which generally are polymer material shelving panels with supporting means integral to the panel; polymer material shelves and drawers may be disposed between the panel supporting means. Storage units may be added by adding additional panels; a back panel may be held in position by any suitable means but not limited to fasteners, clips, bolts, rivets, pop rivets, and the like.

U.S. Pat. No. 7,823,948 for System for shelf mounting in mobile truck body by inventors Redman and Bauer filed Nov. 22, 2006 and issued Nov. 2, 2010 discloses a system for mounting adjustable shelves in a mobile truck body application, including integrated attachment means to receive a shelving panel for affixing thereto; the shelving panels contain at least two slots to receive a fastener, and likewise, the integrated attachment means contain at least two slots corresponding to the slots of the shelving panel to receive the same fastener.

U.S. Pat. No. 8,082,698 for Modular enclosure for utility trailers and pickup trucks by inventor Drake filed Feb. 26, 2010 and issued Dec. 27, 2011 is directed to a light weight, modular enclosure, mounted on a utility trailer or pickup truck, including foam-encapsulated panels and corners; pieces engage via key pins and key sockets.

U.S. Pat. No. 8,117,972 for Kit and shelving system to store work tools by inventors Winget et al. filed Jul. 9, 2008 and issued Feb. 21, 2012 discusses a shelving system for storing work tools and equipment in a motor vehicle. Each of the shelves includes a reinforced composite panel of the cellular core sandwich-type.

U.S. Pat. No. 8,371,785 filed Jun. 1, 2007 and issued Feb. 12, 2013 and U.S. Pat. No. 8,696,278 filed Jan. 3, 2013 and issued Apr. 15, 2014 both for Rivet nut and rivet bolt and combination by inventors Babej, et al. are directed to a rivet nut with a base part and cylindrical rivet section.

The utility truck and/or truck bed prior art is generally known to provide thermoformed plastic components in the prior art; representative examples of relevant prior art US patent documents include the following:

U.S. Pat. No. 7,157,034 for Twin-sheet thermoforming process by inventors Bristow, et al. filed Mar. 15, 2004 and issued Jan. 2, 2007 discloses a twin-sheet thermoforming process for the manufacture of vehicle headliners wherein the first and second sheet of superlite material are mounted into frames, the frames transfer the sheets into an oven where they are heated to a desired temperature using infrared (IR); the first sheet is combined with a cover-stock material using compression molding forming a covered first headliner part, which is transferred to a second mold station; the second sheet is heated and transferred to the oven where it is vacuum-formed on the upper half mold; the upper and lower mold halves are pressed together using fusing and sealing into a unified part; the superlite material is a sheet of low-pressure, thermoformable, thermoplastic composite comprised of polypropylene and long chopped glass fibers.

U.S. Pat. No. 6,394,534 for Poly-bilt truck by inventor Dean filed Jan. 30, 2001 and issued May 28, 2002 describes a commercial truck body formulated of a co-polymer material with certain strategic corners of co-polymer material being formed by a single sheet of copolymer bent into predetermined angle and extrusion welded on the interior portion of the corner; other junctions are formed using traditional fusion, butt and other joint techniques; a liquid storage tank by be integrally formed with the body.

U.S. Pat. No. 6,389,989 for Twin sheet pressure formed pallet by inventor Hagerty filed Jan. 5, 2001 and issued May 21, 2002 describes a pallet formed of a pair of thermoplastic sheets molded and fused together, wherein the sheets have configurations to impart stiffness and high strength, and the ability of pallets to be stacked on full pallets; the molded configurations enable the sheets to be fused at a plurality of planes including mutually perpendicular planes for high strength union of the sheets; the sheets are made of thermoplastic material with upper and lower sheets on shaped aluminum tools to form the pallet through application of heat, vacuum, and/or pressure.

U.S. Pat. No. 4,606,278 for Twin sheet pallet by inventor Shuert filed Sep. 28, 1984 and issued Aug. 19, 1986 discloses a twin sheet plastic sheet with no core.

U.S. Pat. No. 6,328,364 for Pull out drawer system for vehicles and trailers by inventor Darbishire filed Feb. 17, 2000 and issued Dec. 11, 2001 is directed to a pull out drawer system for trailers and vehicles including a stationary mounting frame; the pull out drawer can be mounted over a wheel well. The drawers and stationary and movable frame foundations can be made of metal, such as aluminum, plastic, or wood. The preferable form includes embodiments of glass fiber reinforced resins, plastics, such as polyolefins, or wood. The invented system is suitable for the floor of a pickup truck bed, vehicle, or trailer.

U.S. Pat. No. 6,340,194 for Hard truck bed cover by inventors Muirhead and Buckingham filed May 15, 2000 and issued Jan. 22, 2002 discusses a fiber reinforced plastic cover including a top surface comprising a first layer of layup fiberglass, a paper honeycomb reinforcing member, a second layer of layup fiberglass, and rail inserts between the plastic layers. U.S. Pat. No. 6,543,839 for Door or lid for a motor vehicle by inventors Gferrer and Hausberger filed Aug. 3, 1999 and issued Apr. 8, 2003 discusses a door of a motor vehicle comprising an inner and outer wall of fiber-reinforced thermoplastic surrounding a core material that is a metallic or polymer foam/honeycomb structure or light wood.

U.S. Pat. No. 6,843,525 for a load bearing floor by inventor Preisler filed Oct. 30, 2001 and issued Jan. 18, 2005 discloses a composite vehicle load floor of the sandwich type having a cell core; the floor comprises reinforced thermoplastic skins surrounding a core of honeycomb polyolefin.

U.S. Pat. No. 6,913,815 for Plastics-covered metal plate for car by inventors Watanabe, et al. filed Feb. 9, 2001 and issued Jul. 5, 2005 is directed to a metal plate wherein one or both sides of the plate are covered by a thermoplastic resin, such as polyolefin and others.

U.S. Pat. No. 7,618,075 for Hybrid truck bed liner by inventors Boddie and Morgan filed Jul. 17, 2008 and issued Nov. 17, 2009 discloses a method to protect a vehicle wear surface with a plurality of liner sections, wherein each liner section comprises a resilient layer and a fabric layer, which forms a water-tight seal that comprises angled surface edges, an overlapping joint, or combinations thereof. The vehicle wear surface comprises a pickup truck bed or storage compartment; the resilient layer comprises a polyolefin; and the fabric layer comprises natural, metal, or synthetic fibers.

U.S. Pat. No. 8,397,650 for Reinforced hollow panel and method of making b inventor Seger filed Jan. 20, 2010 and issued Mar. 19, 2013 is directed to a hollow upper deck panel for a plastic pallet has a smooth solid top surface and is made by thermoforming heated upper and lower twin sheets of thermoplastics material.

U.S. Pat. No. 8,511,742 for Automobile component made of plastic by inventors Legler, et al. filed Jul. 6, 2009 and issued Aug. 20, 2013 is directed to a vehicle component made of plastic with at least one supporting layer and at least one outer skin. The supporting layer consists of a thermoset, a honeycomb layer or a foam layer of plastic or metal, and a glass fiber mat. The outer skin is preferably a thermosetting plastic.

U.S. Pat. No. 8,550,544 for Vehicle body by inventor Auer filed Feb. 2, 2010 and issued Oct. 8, 2013 discusses a vehicle body comprising an inner shell, an outer shell, a floor plate, and a chassis, wherein the inner shell, outer shell, and floor plate are directly or indirectly interconnected. When connected, this compartment is independently fastened to the chassis. The inner shell and outer shell is made of a long fiber reinforced thermoplastic.

U.S. Pat. No. 8,690,228 for Load bearing panel assembly by inventors Marchesano and Saur filed Jan. 31, 2013 and issued Apr. 8, 2014 is directed to a panel assembly including at least one reinforcing assembly of a high strength material, such as dual-phase steel; the panel assembly may be used for a vehicle floor. The appearance surface of the panel may include a thermoplastic olefin, and the reinforcing assembly is inserted into the mold forming the panel assembly.

U.S. Pat. Nos. 8,764,089, 8,795,807, 8,808,827, 8,808,828, 8,808,829, 8,808,830, 8,808,831, 8,808,833, 8,808,834, and 8,859,074 by inventors Preisler and Heikkila filed between Nov. 27, 2012 and Feb. 8, 2013 and issued between Jul. 1, 2014 and Oct. 14, 2014 disclose a compression-molded composite with panel first and second skins and a core positioned between the skins, wherein the skins are fiber-reinforced thermoplastics and the core is thermoplastic, cellular, or honeycomb structure; the thermoplastic is mainly polyolefin.

U.S. Pat. No. 8,844,227 by inventor Ciuperca filed Mar. 15, 2013 and issued Sep. 30, 2014 discloses a reinforcing insert consisting of fiberglass or aluminum.

US Patent No. 20100119768 by inventors Simon and Robinson filed Mar. 24, 2008 and issued May 13, 2010 is directed to a core product made of thermoformable material, preferably olefinic material, and formed by at least thermoforming. Disclosed are thermoplastic honeycomb cores and honeycomb cores faced with fiber-reinforced resin; honeycomb cores are ideal for use as a truck or trailer floor.

Aluminum or metal reinforcement is generally known in the utility truck and/or truck bed prior art; representative examples include the following:

U.S. Pat. No. 7,066,532 for Ultrathin structural panel with rigid insert by inventor Shoemann filed Nov. 12, 2002 issued Jun. 27, 2006 disclosing an ultrathin covered structural panel including a panel body made from lightweight moldable material and including one or more rigid high-strength inserts in the interior of the panel body, wherein the inserts are placed into the cavity of a mold that has the shape of a structural panel and a thickness of not more than about 20 mm; a lightweight moldable material is introduced into the mold cavity is allowed to harden to form the structural panel, which is removed from the mold; the structural panel is provided for load-bearing support; steel, aluminum, and metal alloys are disclosed for the structural insert material.

U.S. Pat. No. 7,686,385 for Flexible truck skirt with floating mount by inventors Dolan, et al. filed Feb. 2, 2006 issued Mar. 30, 2010 describes a skirt panel comprising a thermoplastic material and including a plurality of panel sections each having one or more ribs on its exterior; the skirt panel is mounted to the vehicle so that it projects below the side of the vehicle, and the skirt panel can move to allow for thermal expansion and contraction without deforming it; one or more struts are mounted between the vehicle and a lower portion of the skirt panel, and the strut is adjustable and deformable to absorb an impact to the exterior of the skirt panel; preferably the strut is made of aluminum and is of sufficiently light guage so that it is bendable by hand.

U.S. Pat. No. 8,221,668 discloses a pickup truck bed box two outer skins and an expandable low density foam plastic therebetween, which embeds two steel wire mesh grid reinforcements made of a welded mesh configuration. Also disclosed are metal wire reinforcements or inserts embedded into polyolefin material; other insert materials are disclosed, such as load rails, pre-formed foam cores, fiberglass mesh, wood, and low density stones.

US Patent Application Pub. No. 20040041429 for Composite panel and method of forming same by inventor McLaren filed May 22, 2003 published Mar. 4, 2004 describes a panel for automotive vehicles wherein the assembly includes a first panel portion opposite a second panel portion and an intermediate material therebetween for liftgate truck bed liners. The panels are formed of a polymeric material and the intermediate material is a structured foam that can bond to the first and second panel portions; the panel portions are formed of steel, aluminum, iron, magnesium, titanium, and combinations thereof.

U.S. Pat. No. 4,330,587 for Metal-thermoplastic-metal laminates by inventor Woodbrey filed Feb. 23, 1981 and issued May 18, 1982 Lightweight metal-thermoplastic-metal laminates exhibiting an improved combination of good formability and bending strength comprise a core layer of a thermoplastic material selected from certain partly crystalline polyamides and polyesters, and a metal layer of certain aluminum alloys laminated on each side of the core layer.

U.S. Pat. No. 5,197,396 for Double deck plastic pallet by inventors Breezer, et al. filed Aug. 5, 1991 and issued Mar. 30, 1993 is directed to a plastic pallet has a twin sheet thermoformed upper deck reinforced with a tubular metal substrate.

U.S. Pat. No. 6,988,757 for Composite panel and method of forming by inventors McLaren, et al. filed May 22, 2003 and issued Jan. 24, 2006 discloses a bed of a pickup truck comprising inner and outer panel portions formed of a material selected from metal, such as aluminum, or a high strength thermoplastic, such as polyolefin, wherein the intermediate material is a reinforcing foam.

U.S. Pat. No. 7,194,098 for Acoustic device by inventors Azima, et al. filed Mar. 7, 2005 and issued Mar. 20, 2007 discloses a honeycomb metal or paper core and reinforced thermoplastic or metal skins.

U.S. Pat. No. 7,200,973 for Wire reinforced thermoplastic coating by inventor Tunis filed Dec. 10, 2003 and issued Apr. 10, 2007 is directed to a structural reinforcing layer made from wire, a structural reinforcing composite layer made from wire, and the resulting load bearing structures made from or retrofitted with wire reinforced plastics and cements; the reinforcing layer may be molded into a load bearing structure, such as a truck body or floor.

U.S. Pat. No. 7,575,264 for Cargo bed structure comprising fiber reinforced polymer inserts by inventor Solomon filed May 2, 2007 and issued Aug. 18, 2009 is directed to a cargo bed structure with a sub-floor assembly and comprising a plurality of interlocking fiber reinforced polymer decking planks. The fiber reinforced polymer structure may include a panel with upper and lower skins and a core therebetween, wherein the core materials may include wood, foam, or various types of honeycomb.

U.S. Pat. No. 8,128,159 for Lightweight hybrid material truck beds by inventors Seksaria and Long filed Sep. 13, 2010 and issued Mar. 6, 2012 is directed to a truck hood including a metal hood skin and a supporting frame including polymer and aluminum reinforcements; the polymer reinforcement comprises thermoplastic or thermoset sheets or pellets.

U.S. Pat. No. 8,413,567 for Vehicle armor by inventors Luter, et al. filed Apr. 28, 2011 and issued Apr. 9, 2013 discloses vehicle armor including a first layer forming an interior bottom surface of the cabin and comprised of a high-strength metal material, a second layer forming an exterior bottom surface of the cabin and comprised of a high-strength metal material, and, a middle layer sandwiched between the first and second layers and comprised of a polymer material. The middle layer is comprised of at least one material selected from the group consisting of a polypropylene thermoplastic composite or a glass fiber reinforced thermoplastic composite.

U.S. Pat. No. 8,424,469 for Plastic pallet with twin-sheet deck and runner structures by inventor Shuert filed Mar. 9, 2011 and issued Apr. 23, 2013 discloses a reinforced plastic pallet comprises a twin sheet deck structure, and a frame of reinforcing beams is encapsulated into the interior space of the upper deck. The frame may be made of steel, aluminum or any other suitable rigid material including composites.

PCT WO1997010396 for Thermoplastic floor planks by inventors Bongartz and Neven filed Sep. 11, 1995 and issued Mar. 20, 1997 is directed to a floor plank made of a thermoplastic material, and discloses a foamed thermoplastic/thermoset material that can be reinforced with metal tubes.

Nowhere does the prior art teach or disclose the solutions provided by the present invention. Thus, there remains a longstanding and unmet need for providing a reinforced modular assembly for utility truck beds as described in this application.

SUMMARY OF THE INVENTION

The present invention relates to an assembly for utility truck bodies and methods of making and using them.

It is an object of this invention to provide an assembly for utility truck bodies, wherein the assembly includes junctions, and includes metal and/or composite reinforcement(s) encapsulated within a thermoformed thermoplastic, a fiber reinforced thermoplastic, or thermoset or fiber-reinforced thermoset floor structure of the assembly or other composite floor structure.

It is an object of this invention to provide an assembly for utility truck bodies further including wall and storage compartment panel components having minimal welding and/or permanent adhesive. The wall and storage compartment panel components further being constructed and configured for modular attachment to the floor.

It is an object of this invention to provide an assembly for utility truck bodies that is fully integral, wherein the floor is integral with the reinforcement system, the sidepack compartments are integral, and the floor is integral with the sidepack, thus forming a unitary assembly.

It is an object of this invention to reduce utility truck drag and noise by providing utility truck sidepacks with aerodynamic features. These features may be joined to the utility truck by removable or permanent means or thermoformed.

Yet another object of this invention is to provide a utility truck body having an assembly including metal and/or composite reinforcement(s) encapsulated within a thermoformed thermoplastic, a fiber reinforced thermoplastic, or thermoset or fiber-reinforced thermoset floor structure of the assembly or other composite floor structure and selectively including modular releasably attachable side storage compartments connected to the utility truck bed reinforced floor.

Additionally, variations and alternative embodiments are provided in the detailed description, and are properly considered to be included within the scope of the present invention.

These and other aspects of the present invention will become apparent to those skilled in the art after a reading of the following description of the preferred embodiment when considered with the drawings, as they support the claimed invention.

DETAILED DESCRIPTION

Figure 1:
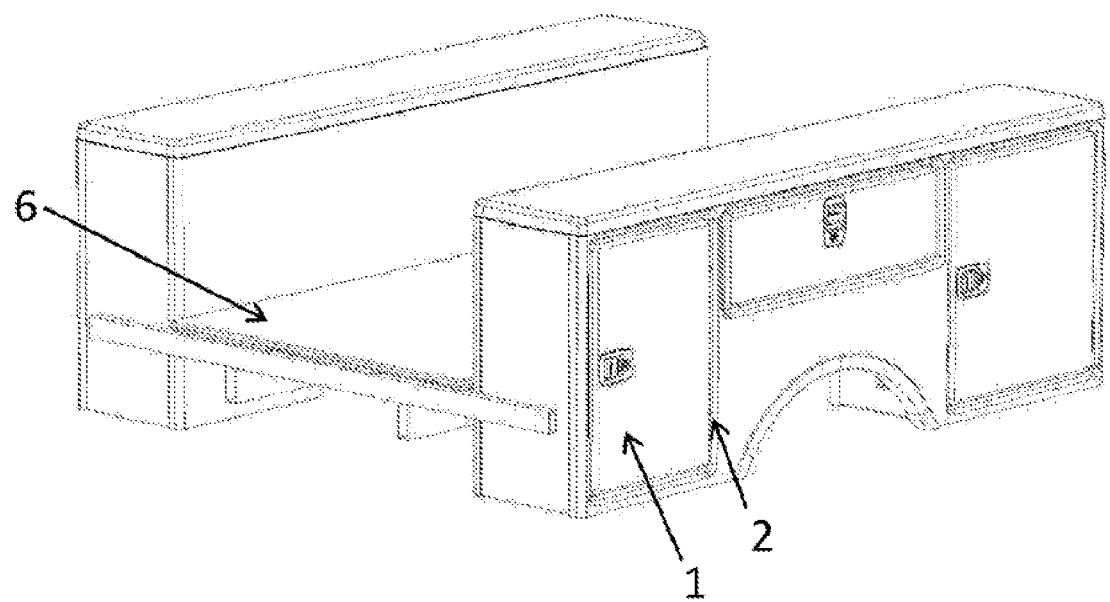
FIG. 1 is a perspective view diagram of one embodiment of the present invention showing the full sidepack modular assembly of the utility truck.

Referring now to the drawings in general, the illustrations are for the purpose of describing a preferred embodiment of the invention and are not intended to limit the invention thereto.

Truck body in this application includes at least components for the floor, and at least one sidepack having at least one storage compartment. More specifically, the term "truck body" as used in this specification to describe the invention is defined as a structure that mounts to the truck chassis frame rails behind a passenger cabin and includes a floor and at least one sidepack that is constructed and configured to function as a sidewall to the truck bed floor; each sidepack includes at least one storage compartment, which provides storage space.

A truck bed is defined as the portion of the truck body that attaches to the truck chassis frame rails and includes a surface that spans at least the distance between the chassis frame rails, i.e., the truck body includes a truck bed assembly and at least one sidepack assembly. The present invention provides an assembly for utility truck beds for providing lightweight, reinforced flooring with removably or permanently attachable components that are formed of lightweight, high strength materials, wherein the reinforced flooring includes metal and/or composite reinforcement(s) encapsulated within a thermoformed thermoplastic, a fiber reinforced thermoplastic, or thermoset or fiber-reinforced thermoset floor structure or other composite floor structure. Material properties of the floor are selected from the group consisting of: electrically non-conductive, non-slip, non-reflective, flame-resistant, solvent-resistant and combinations thereof.

The present invention is related to US Pub. No. 20180126627, filed Nov. 3, 2017 and published May 10, 2018, which is incorporated herein by reference in its entirety.

Figure 2:
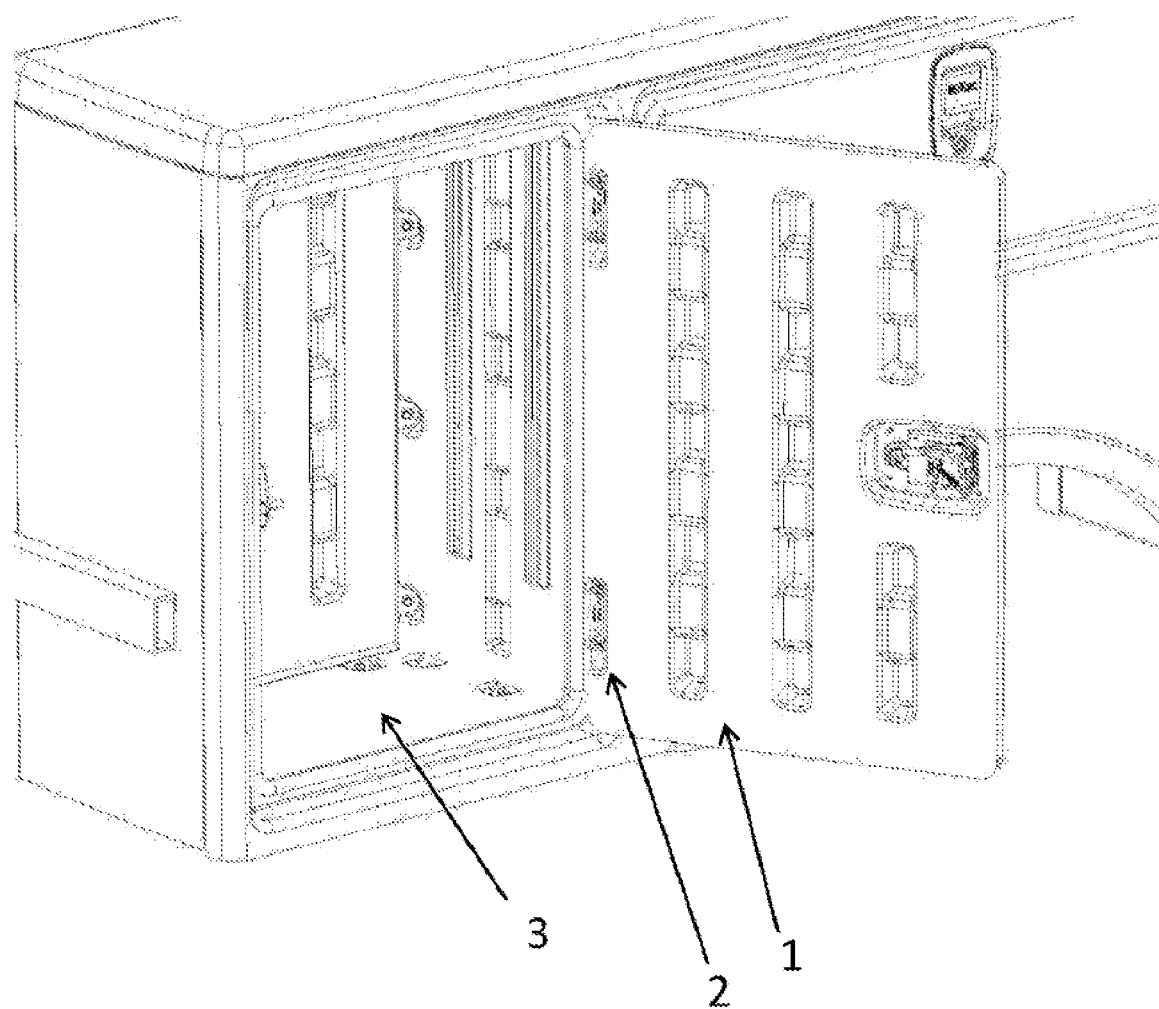
FIG. 2 is a perspective diagram of a sidepack storage compartment.

In a preferred embodiment, the sidepack is a fully integral unit that also functions as a truck body wall reinforcement, such as shown in FIGS. 1-2. This embodiment removes the requirement for components to be assembled or connected for construction. Alternatively, the sidepack may consist of a shell and modular storage compartments 3 that are re-configurable within the shell. In another embodiment, the removably attachable modular components include sidepacks that also function as truck body wall reinforcement; in preferred embodiments of the present invention, a plurality of modular panels are removably attached to each other to form a sidepack. Alternatively, modular panels may be permanently attached to each other to form a sidepack. Also, alternatively, the sidepack may be formed from components or structures that are larger than each of the modular panels, i.e., each of the at least one storage compartments may be thermoformed, and removably or permanently attached to each other to form a sidepack.

In other embodiments of the present invention, modular panels are removably attached to each other by mechanical fasteners. Modular junctions of the assembly of the present invention include wall, sidepack(s), and/or storage compartment panel components; mechanical fasteners are provided for removably attaching the wall, sidepack(s), and/or storage compartment panel components with the floor section and body of the assembly. Preferably, the sidepacks having storage compartments are formed from modular components or panels that are connectable or attachable using mechanical fasteners, such as bolts, rivnuts, tracks, etc., which allows for removable attachment to the overall truck body assembly of the present invention. A sidepack storage compartment is shown in FIG. 2. Alternatively, modular panels may be permanently attached by welding or chemical bonding, adhesives, etc. In the alternate embodiments of structures larger than single panels described in the foregoing, removable and/or permanent attachment may be via physical bonding, chemical bonding, mechanical attachment, mechanical interlocking, magnetism, reversible adhesive, irreversible adhesive, welding including plastic welding, and/or vacuum attachment.

In a preferred embodiment of the present invention, modular or integral components, and in particular, the modular sidepack panels are manufactured out of a thermoplastic olefin material that is formed to the desired shape and configuration in a process of twin sheet thermoforming. The components may also be formed of a stiff composite material. In one embodiment, thermoplastic olefins are used for providing a lightweight, strong assembly. The truck body flooring and sidepack(s) are formed from a thermoplastic material in one embodiment of the present invention. In a preferred embodiment of the present invention, a twin-sheet thermoforming process is used, having reduced costs for manufacturing and increased strength and stiffness of the components. In alternative embodiments, any type of reinforced or unreinforced thermoplastic and any type of thermoforming process, or other thermoplastic manufacturing process, such as injection molding, rotational molding, injection molding, rotational molding, compression molding, compression molding using unidirectional tape, compression molding using sheet molding compound, compression molding using bulk molding compound, gravity fed casting, low pressure casting, high pressure casting, resin transfer molding including light resin transfer molding, 3D printing, extrusion, Digital Light Synthesis (DLS) including Continuous Liquid Infusion Production, vacuum forming, infusion including vacuum infusion, hand layup, infusion, flex molding, lamination, squish molding, chop spray, and/or pultrusion are used in the construction of the modular sidepack panels (or integral sidepacks). The thermoplastic components and the truck body assembly formed thereof provide an assembly formed from removable or removably attachable or permanently attached, lightweight, high strength components. Any fiber architecture may be used, but continuous fiber reinforcement, discontinuous fiber reinforcement, particle fiber reinforcement, and fabric braided fiber reinforcement for both thermoset 9 and thermoplastic 8 are shown in FIGS. 10-13, respectively.

In a preferred embodiment, the sidepack structure is divided into smaller storage compartments, like that shown in FIG. 2, that are designed, constructed and configured to be waterproof or watertight to protect equipment and/or any items that are stored inside them. Waterproof seals are provided at the interfaces, such as by way of example and not limitation, between the door 1 and storage compartment 3 or between modular panels, and more preferably, at any joint or opening.

Regarding the doors, in a preferred embodiment, the doors 1 are removably attached to the sidepack(s) by means of a hinge 2, which may be constructed from metal, or other suitable material. Alternatively the doors may be thermoformed with a "living hinge" built in. A living hinge is a thin flexible hinge that is molded into the door itself so the hinge and the door are one component made from the same material. Alternatively it may be possible to mold the doors into the front face of the sidepack(s) with a living hinge incorporated into the design. If this method were used, it would not be necessary to attach the doors to the sidepack(s) because they would already be attached to the front face of the sidepack(s). In yet another alternative, the doors may be permanently attached. In another embodiment, the sidepack storage compartments 3 may have more than one door 1, for example, one facing into the truck bed and one facing away from the truck. This embodiment would allow supply acquisition from inside the truck bed, which may be particularly useful for truck beds supporting boom and lifts among other situations.

Figure 14:
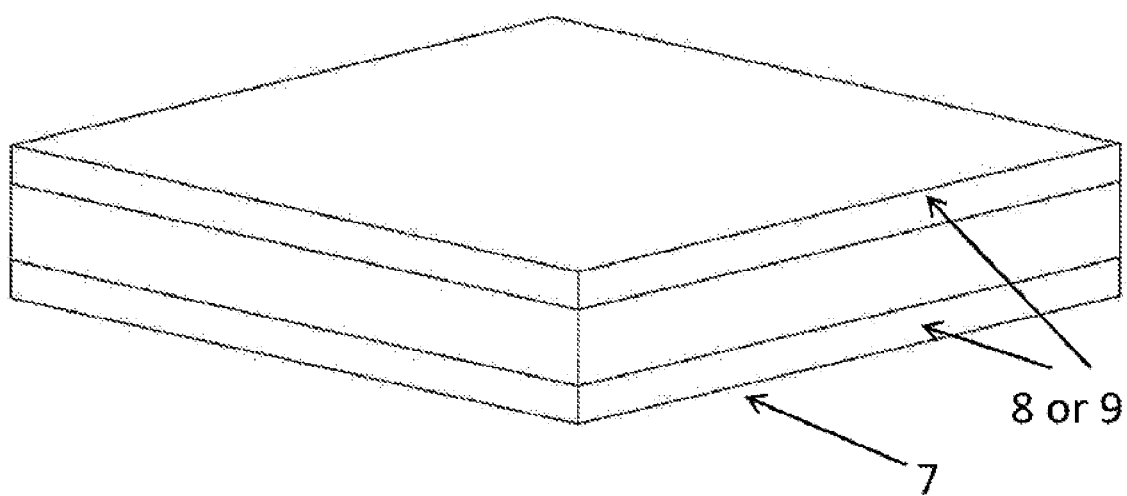
FIG. 14 is a diagram of a foam core between thermoplastic or thermoset skins.
Figure 15:
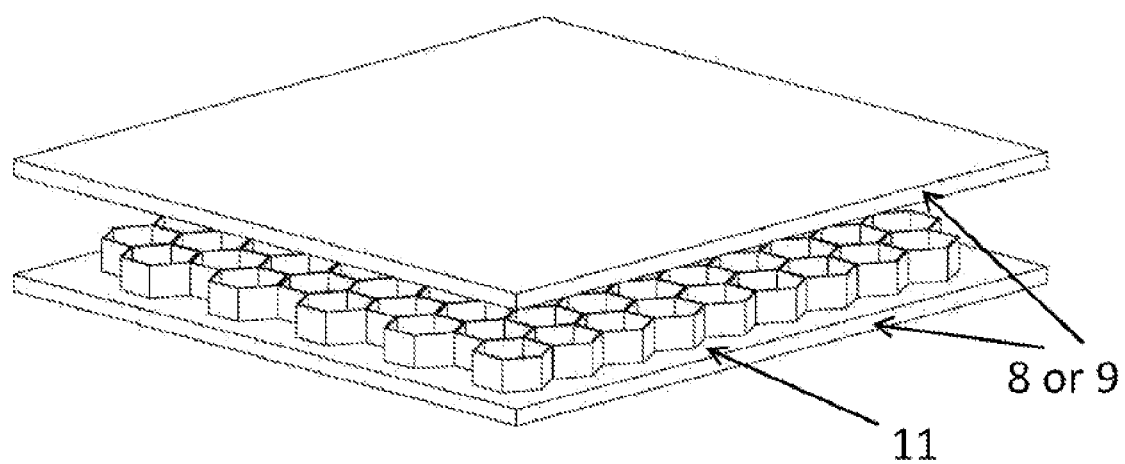
FIG. 15 is a diagram of a honeycomb between thermoplastic or thermoset skins.
Figure 16:
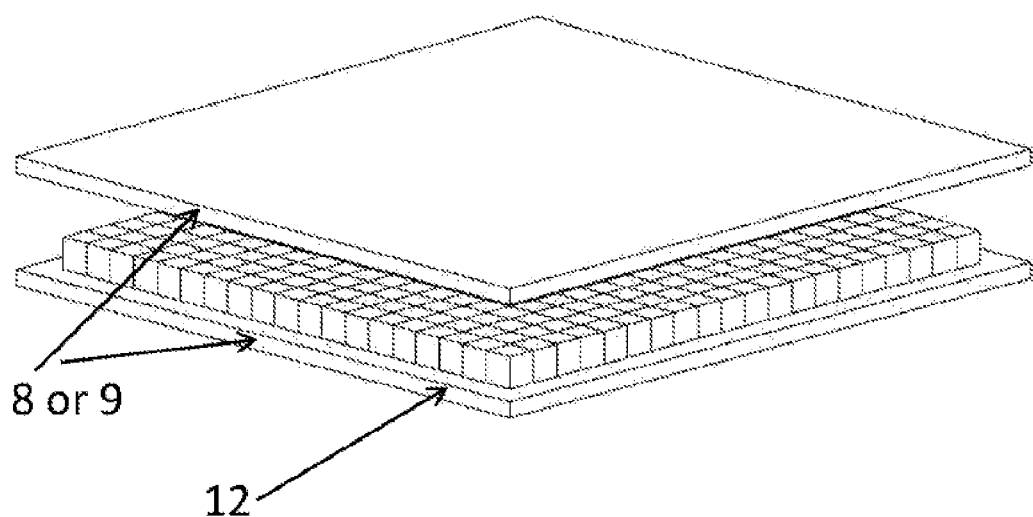
FIG. 16 is a diagram of a wood reinforcement between thermoplastic or thermoset skins.

Also, regarding the doors, in a preferred embodiment, the doors are manufactured out of a thermoplastic olefin material that is formed to the desired shape in a process called twin sheet thermoforming (methods described in the specification). Alternatively any type of reinforced or unreinforced thermoplastic 8 may be substituted for thermoplastic olefin in the construction of a door. Furthermore, any type of thermoforming or other thermoplastic manufacturing process such as injection molding, rotational molding, etc. may be used to form a door. Furthermore, in an alternative embodiment, the doors are manufactured out of a thermoset 9 or reinforced thermoset that may or may not include a foam core 7 and/or honeycomb core 11 and/or wood core 12, which are shown in FIGS. 14, 15, and 16, respectively. Other cores include fabric cores such as glass fabric cores. By way of example, 3D woven sandwich glass fabrics, including those woven out of e-glass fibers, carbon fibers, Kevlar® fibers, etc., such as Parabeam® 3D fabric, are used as cores in one embodiment of the present invention. Examples of foam cores used in the present invention include a thermoplastic foam core, a polyurethane foam core, a syntactic foam core, a polymethacrylimide (PMI) foam core, a Polyethylene Teraphalate (PET) foam core, a cross linked polyvinyl chloride (PVC) foam core, a linear PVC foam core, and/or a polyester foam core. In other embodiments, a balsa core, a fiberglass core, a fabric core including laminate bulkers, and/or a carbon core are utilized.

The doors may be manufactured out of thermoset through any of these methods: compression molding using sheet molding compound; compression molding using bulk molding compound; compression molding using thick molding; compression molding using wet molding; resin transfer molding; light resin transfer molding; vacuum infusion; chop spray; and hand layup. The thermoset door may also include pultruded fiber reinforced components.

In another embodiment, reinforced or unreinforced thermoplastics are filled or unfilled. Examples of thermoplastic fillers include inorganic fillers and mineral fillers including cast and extruded nylon or polyamides such as Nylatron®, cast or extruded nylon or polyamides with additives such as oil, molybdenum including molybdenum disulfide, solid lubricant including ultra-high-molecular-weight polyethylene (UHMWPE), ultra-high-molecular-weight (UHMW) fibers, bulletproof fibers such as Dyneema®, polytetrafluoroethylene (PTFE) such as Teflon®, high-density polyethylene (HDPE), self-healing materials including self-healing elastomers, self-healing polymers, and self-healing composites such as the self-healing materials described in "Self-healing polymers and composites" by T C Mauldin & M R Kessler International Materials Reviews, 55:6, 317-346, DOI: 10.1179/095066010X12646898728408 (2010), which is incorporated herein by reference in its entirety, wax, glass, ceramics, resin, kaolin (clay), aramids such as Kevlarg, Nomex®, Technira®, etc., aluminum, alumina trihydrate, calcium sulfate, calcium carbonate, dolomite, barium sulfate, talc, wollastonite, ultraviolet (UV) stabilizers or UV inhibitors including thermoplastic olefin (TPO), etc. TPO refers to any polymer/filler blend and more preferably to polymer/filler blends that include Polypropylene, Polyethylene, Block Copolymer Polypropylene, rubber, and reinforcing filler. Common rubbers used in TPO's include: Ethylene Propylene Rubber, EP-diene rubber, Ethylene-Octene, Ethylbenzene, Styrene-Ethylene-Butadiene-Styrene. Common fillers used in TPO's include: Talc, Fiberglass, Carbon Fiber, Wollastonite, and Metal Oxy Sulfate.

Other fillers include organic fillers such as wood, wood flour, balsa, cellulose, shell flour, etc. Reinforced or unreinforced thermosets are also filled or unfilled and include any of the above organic and/or inorganic fillers.

Material selection and the geometry used within a component strongly influence the strength and stiffness of that component. By using strategic geometries such as sandwich structures and twin sheet thermoformed kiss-off locations it is possible to use reinforced or unreinforced polymers to create truck bodies that are less expensive, lighter, stronger, and stiffer than truck bodies made out of Steel and Aluminum. Reinforced thermoset polymers combined with relatively thick and light weight core materials in the form of a sandwich structure create a very stiff yet light weight component due to the distance between the skin sheets, the high shear strength between the skin sheets and the core, and the high tensile and compressive strengths of the skin sheets. Thermoplastic components manufactured in a Twin Sheet Thermoforming process contain two plastic sheets that are separated by an air gap with the exception of small periodic "kiss-off" locations where the two plastic sheets are joined via plastic-welding. The air gap between the majority of the two plastic sheets is at least twice the thickness of an individual plastic sheet. Alternatively, the air gap between the two plastic sheets is about half the thickness of an individual plastic sheet. The gap is any distance between any two points on the two plastic sheets in yet another embodiment. Advantageously, the gap provides for both thermal insulation and acoustic insulation for the component formed by twin sheet thermoforming. The distance between the two plastic sheets allows the high shear strength kiss-off locations to resist most of the bending forces applied to the structure. It is possible to fully encapsulate stiffening members between the two plastic sheets for use in applications where additional stiffness is required. Traditional materials, such as Steel, are used to produce heavy, low-cost, truck bodies. Aluminum truck bodies are lighter than steel truck bodies, but they are the most expensive. Fiberglass reinforced thermoset composites are currently used to produce truck bodies but the manufacturing methods and material combinations that are currently used need improvement. This invention teaches novel material combinations and manufacturing methods to produce bodies made out of thermoset polymer and/or thermoplastic polymer that may or may not include reinforcement. The material combinations and strategic geometries taught in this invention provide highly stiff, minimally flexible characteristics and describe the following: Truck bed floor that deflects less than ⅛th of an inch when 1.4 psi is applied to the entire truck bed floor when the entire truck bed weighs less than 0.030 lbs per square inch of truck bed floor; and sidepack floor that deflects less than ⅛th of an inch when 0.14 psi is applied to the entire sidepack floor when the sidepack floor weighs less than 0.015 lbs per square inch.

Figure 4:
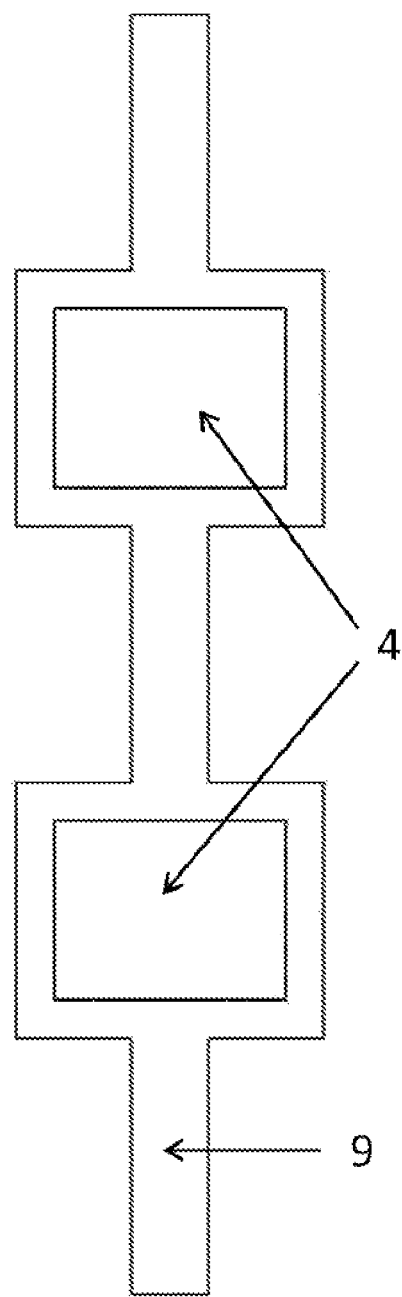
FIG. 4 is a perspective diagram of a cross section of thermoset with metal reinforcement.
Figure 5:
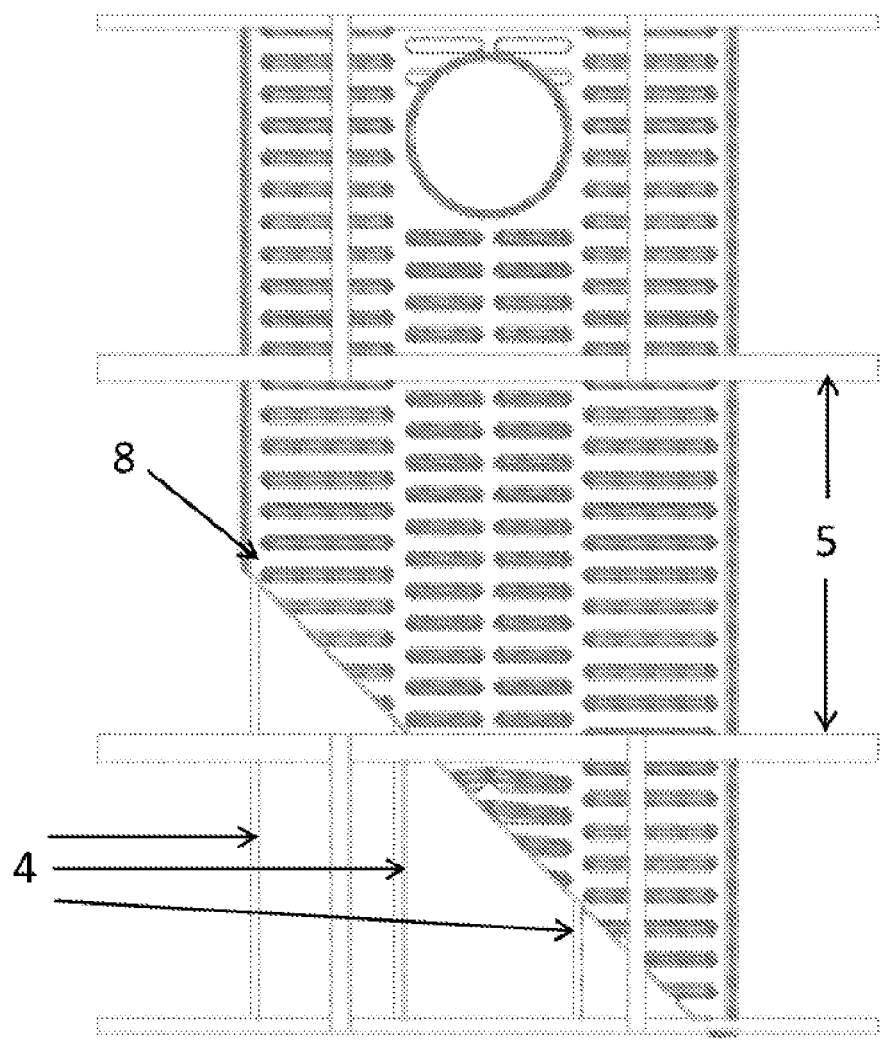
FIG. 5 is a bottom perspective diagram of a thermoplastic floor with metal reinforcement exposed.
Figure 6:
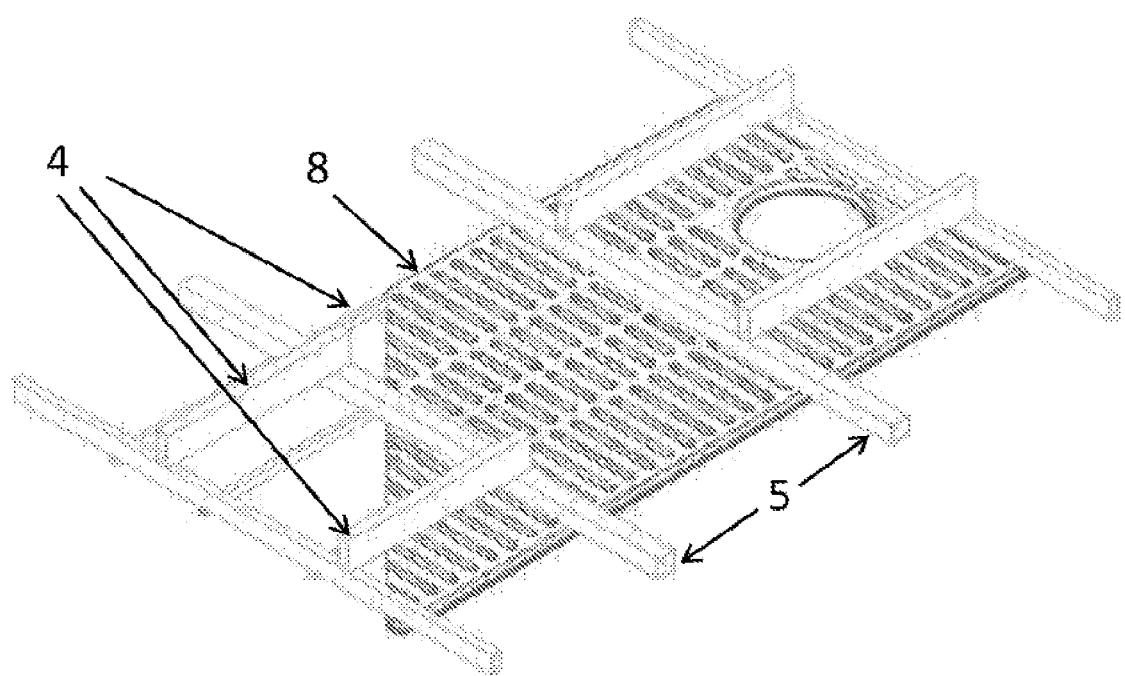
FIG. 6 is a bottom perspective diagram of thermoplastic floor with metal reinforcement exposed.
Figure 7:
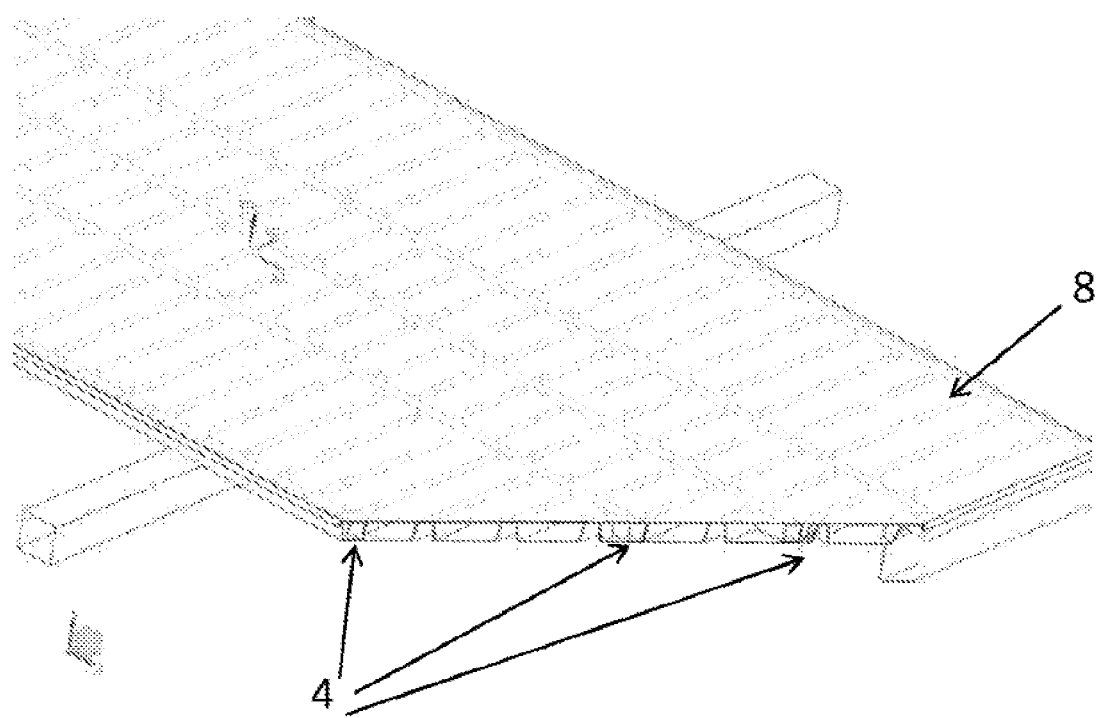
FIG. 7 is a top perspective diagram of thermoplastic floor with metal reinforcement exposed.
Figure 8:
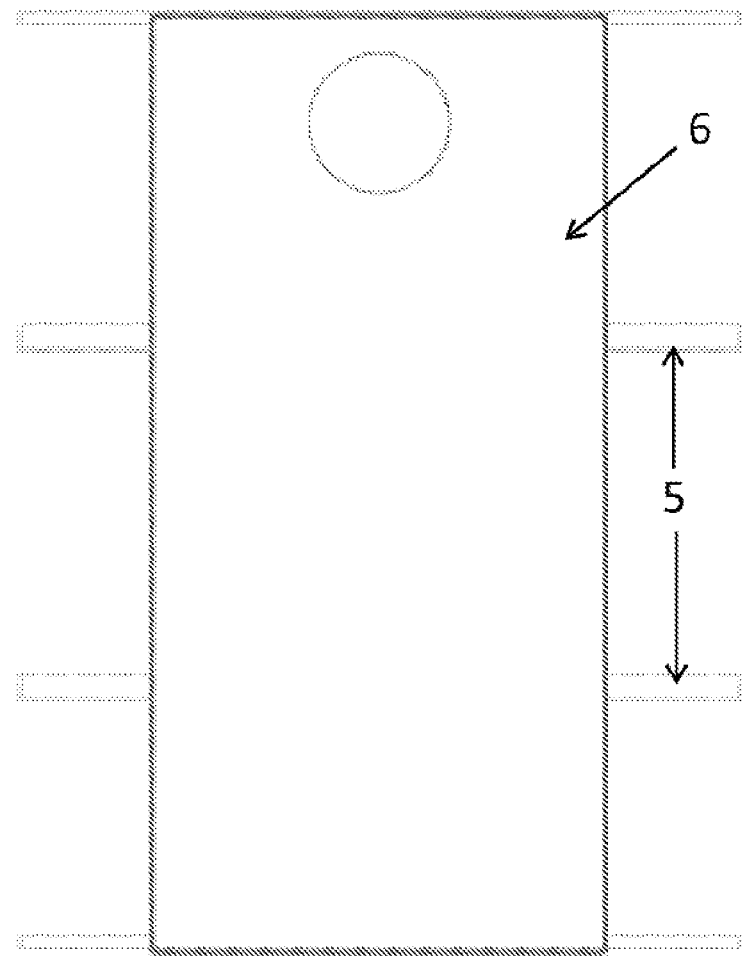
FIG. 8 is a top perspective diagram of a floor.
Figure 9:
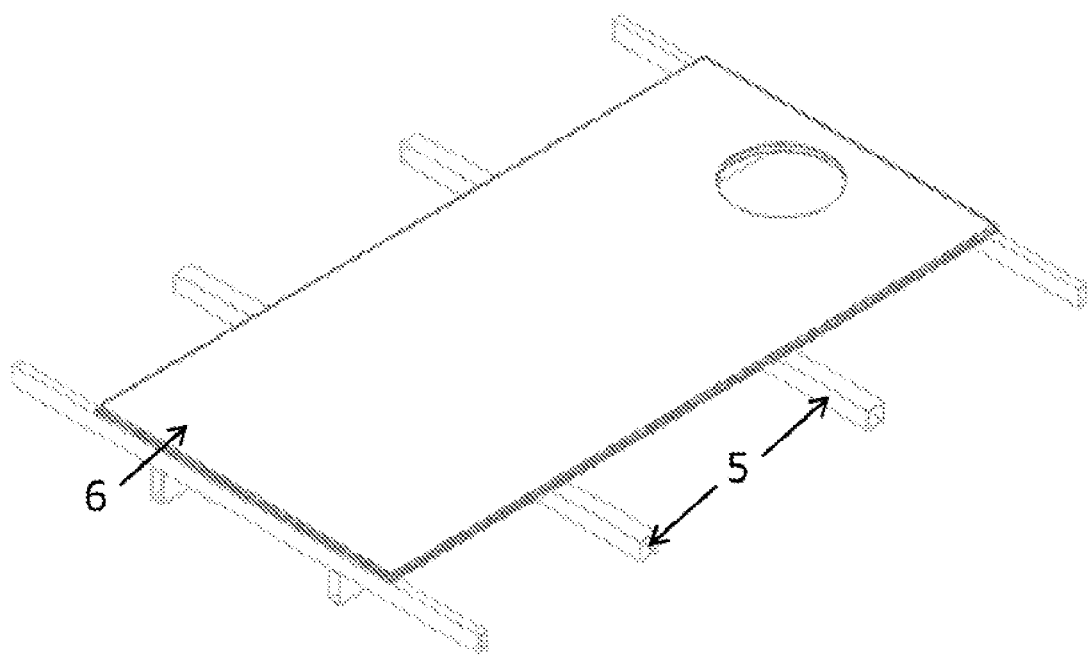
FIG. 9 is a top perspective diagram of a floor.
Figure 10:
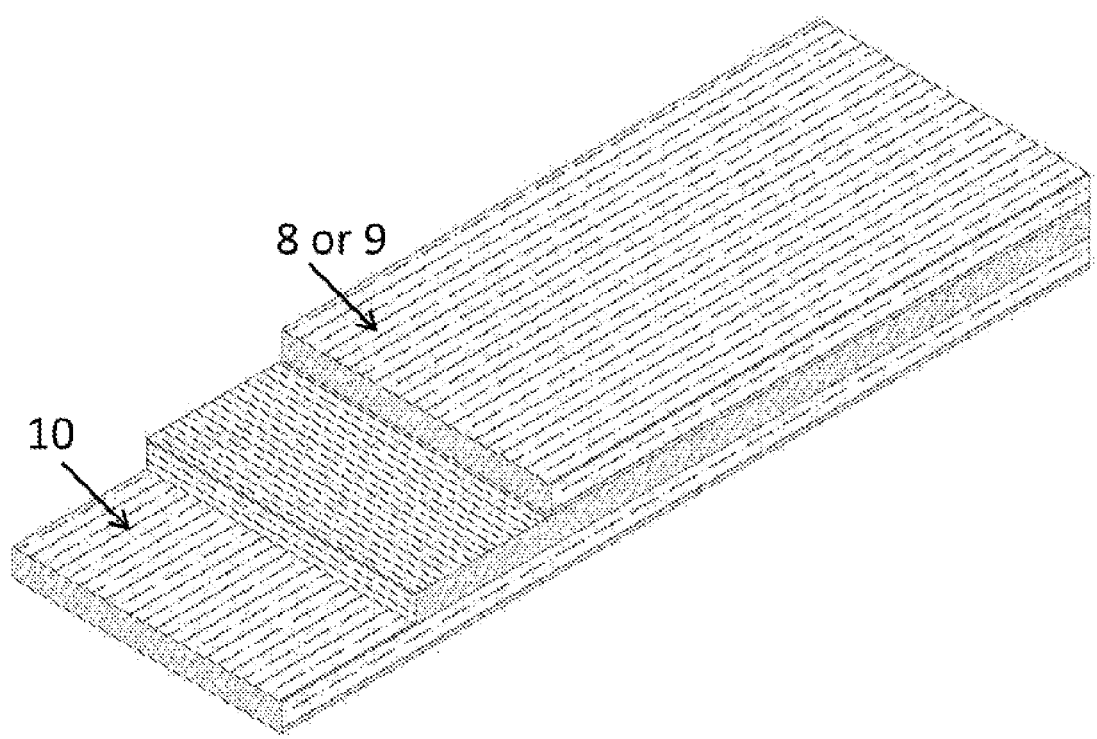
FIG. 10 is a diagram of a continuous fiber reinforcement in thermoplastic or thermoset.
Figure 11:
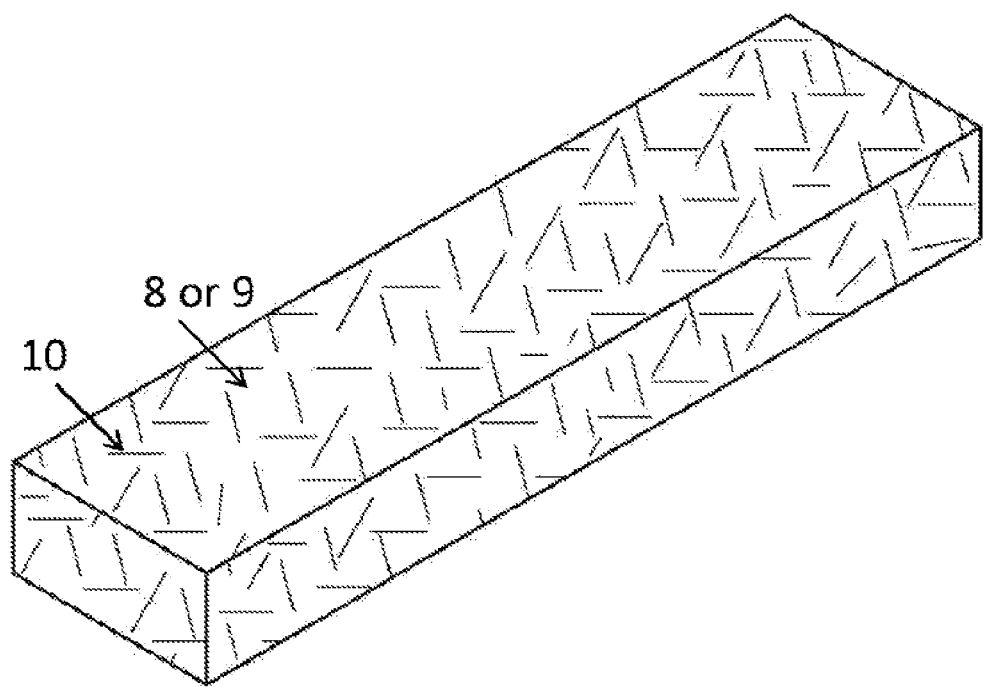
FIG. 11 is a diagram of a discontinuous fiber reinforcement in thermoplastic or thermoset.
Figure 12:
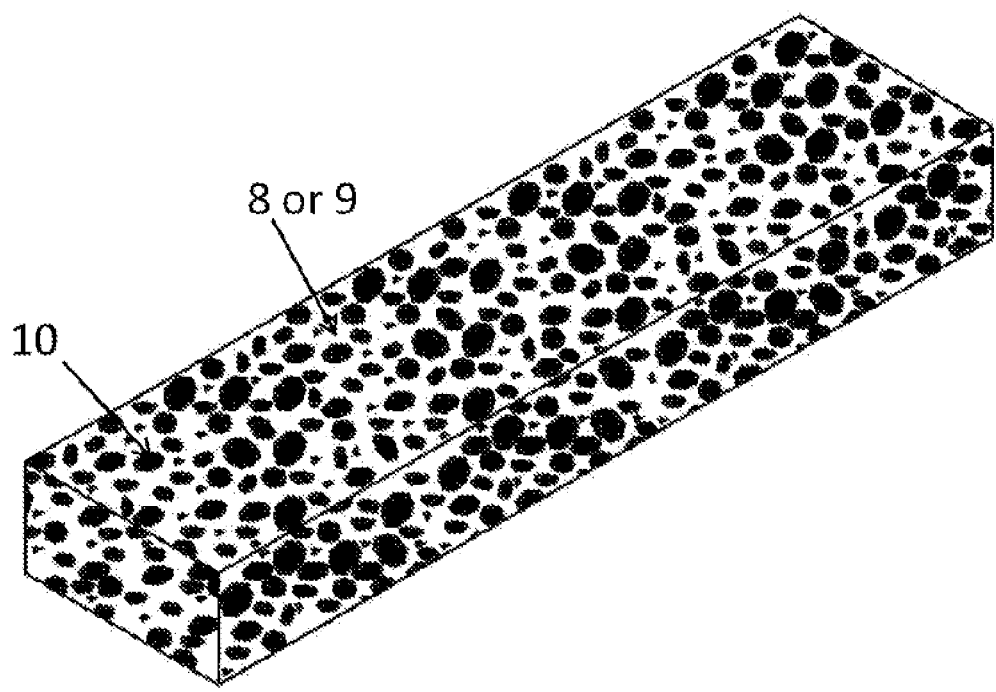
FIG. 12 is a diagram of a particle fiber reinforcement in thermoplastic or thermoset.
Figure 13:
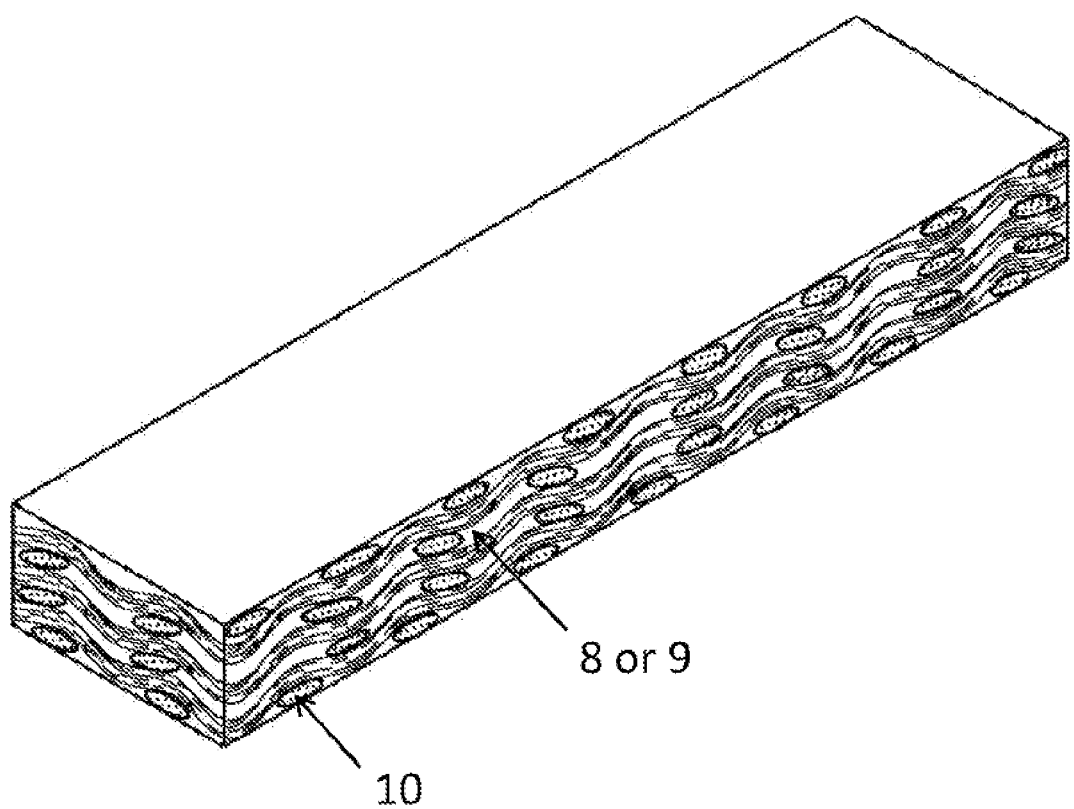
FIG. 13 is a diagram of a fabric, braided fiber reinforcement in thermoplastic or thermoset.

Regarding the truck bed as shown in FIGS. 5-9, in one embodiment, the truck bed assembly includes a walking surface floor 6 and external aluminum cross members 5 underneath the walking surface floor, which is made of a thermoplastic olefin material that is formed to the desired, predetermined shape and size in a process of twin sheet thermoforming. In an alternative embodiment having a thermoplastic flooring option, any type of reinforced or unreinforced thermoplastic, such as continuous fiber, discontinuous fiber, particle fiber, or fabric braided fiber reinforcement (FIGS. 10-13), may be substituted for thermoplastic olefin in the construction of the walking surface of the floor; and any type of thermoforming or other thermoplastic manufacturing process such as injection molding, rotational molding, etc. may be used to manufacture the walking surface of the floor. In an alternative embodiment having a thermoset flooring option, walking surface of the floor assembly may be made out of a fiber-reinforced thermoset or an unreinforced thermoset such as DCPD. It is more likely that a fiber-reinforced thermoset will be used if this option is pursued. Unreinforced thermoset materials are not very common at the time of the present invention, but they may become more common in the future. The thermoset floor option may be manufactured through any of these methods: injection molding, rotational molding, compression molding including compression molding using sheet molding compound, compression molding using bulk molding compound, compression molding using thick molding, and/or compression molding using wet molding, gravity fed casting, low pressure casting, high pressure casting, resin transfer molding including light resin transfer molding, 3D printing, extrusion, Digital Light Synthesis (DLS) including Continuous Liquid Infusion Production, vacuum forming, infusion including vacuum infusion, hand layup, infusion, flex molding, lamination, squish molding, chop spray, and/or pultrusion. The thermoset floor option can also be manufactured by adhering pultruded components together. A cross section metal reinforcement within a thermoset is shown in FIG. 4.

Figure 3:
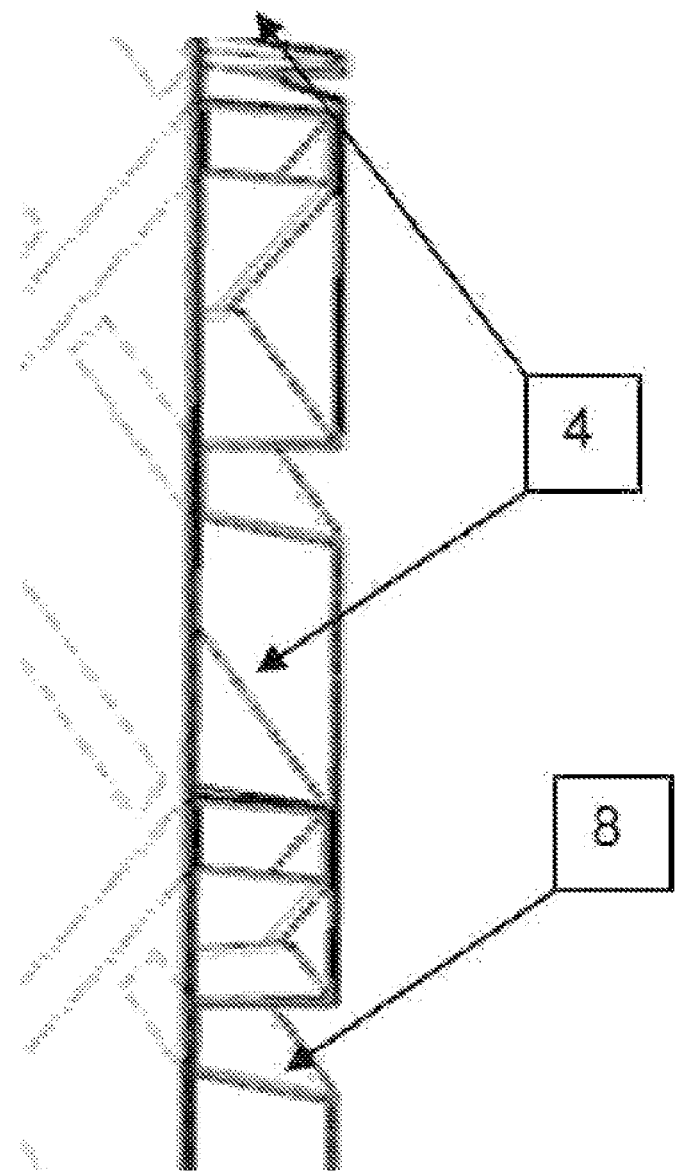
FIG. 3 is a perspective diagram of a cross section of thermoplastic with metal reinforcement.

Also, in the floor assembly in a preferred embodiment, at least one reinforcement is provided; by way of example and not limitation, aluminum framing or tubing is encapsulated within the thermoformed floor assembly for providing a reinforced walking surface with additional strength. A cross section of metal reinforcement within a thermoformed floor is shown in FIG. 3. In an alternative embodiment, a fiber-reinforced thermoset floor is provided that may or may not include additional reinforcement encapsulated within. In alternative embodiments that include additional reinforcement encapsulated within, acceptable additional reinforcement materials are selected from foam, reinforced or unreinforced thermoplastic, metal, and combinations thereof. In the preferred embodiment, at least one external reinforcement is provided, external aluminum cross-member 5 elements are removably attached (or non-permanently attached) to the bottom of the walking surface floor by means of mechanical fasteners such as bolts, rivnuts, tracks, etc. Alternatively, the external aluminum cross-member 5 elements may be removably attached via fasteners, or permanently attached to the bottom of the walking surface floor 6 by means of welding, chemical bonding, or adhesive. In an alternative to the preferred aluminum cross-member elements, any type of suitable metal or fiber-reinforced thermoset may be used. In the preferred embodiment, external aluminum cross-member 5 elements extend beyond the sides of the walking surface floor of the truck bed assembly, and function as a supporting ledge for the sidepack(s) to rest on without being affixed thereto. Note that the aluminum cross-members and the walking surface floor make up the truck bed assembly as shown in FIGS. 10-13. In the preferred embodiment, the sidepack(s) are removably attached to the aluminum cross-member 5 elements by mechanical fasteners or are alternatively permanently attached to the aluminum cross members by welding or chemical bonding, or adhesive. In another preferred embodiment, the floor ledges are integrally formed with the sidepack(s).

In one embodiment, a small aerial truck body assembly is provided, including modular components having a truck bed section and at least one sidepack or side storage compartment that functions as truck walls and/or truck wall reinforcement while also providing storage space. Also, minimal welding and/or permanent adhesive is used for the modular assembly connection, thereby providing maximum removable attachment and selective detachment of the modular components that together form the overall truck body assembly of the present invention. The truck bed section includes a walking surface floor component that further includes metal and/or composite material framing to reinforce the thermoplastic 8 walking surface floor, as shown in FIGS.

4-9; preferably, an aluminum reinforcement framing is encapsulated within the thermoplastic 8 material forming the walking surface floor section. The framing functions to provide reinforcement for supporting the weight of at least one human body in addition to load or cargo within the truck body assembly. Preferably, the assembly and in particular the floor section is designed, constructed and configured to hold at least between about 750 lbs and about 1500 lbs per 2 ft×3 ft area. In another embodiment, the assembly is designed constructed and configured to hold at least about 1500 lbs per 2 ft×3 ft. Alternative to framing, metal and/or composite material tubing may be used to reinforce the thermoplastic 8 walking surface floor. Framing is a support that does not contain a bore through the long axis, while tubing is a support that does.

In the twin-sheet thermoforming process used in a preferred embodiment of the present invention, the method includes the following steps: providing aluminum framing/tubing reinforcement components and thermoplastic material for surrounding and enclosing the aluminum framing/tubing reinforcement; and heating and processing the thermoplastic material to form the modular assembly components, including at least a floor section with the aluminum framing reinforcement. The aluminum frames/tubes encapsulated inside the thermoplastic floor provide increased load-bearing strength.

Thermoplastic Olefin (TPO) twin sheet thermoformed materials are used in preferred embodiments of the present invention. In preferred embodiments of the present invention, the modular components of the assembly, including but not limited to the side packs, side storage compartments, doors, and floor section are formed from TPO. Beneficially, the TPO material combined with the twin sheet thermoforming process yields satisfactory strength at a much lower weight than prior art materials or assemblies, including all modular components.

Also, in preferred embodiments of the present invention, the floor section includes metal and/or composite reinforcements, such as those shown in FIGS. 10-13, encapsulated inside of the TPO twin sheet thermoformed structure for providing high strength and load-bearing, while maintaining a lightweight overall component structure and assembly. In one embodiment, aluminum reinforcements, like those shown in FIGS. 3 and 4, are used for light weight, high strength.

Thermoforming also beneficially reduces manufacturing time over traditional truck body manufacturing methods. Manufacturing time is reduced in methods for making the modular assembly of the present invention due to the "all in one" thermoforming process. Nowhere in the prior art for truck body flooring sections is it taught to encapsulate aluminum framing within a plastic twin sheet floor section with a thermoforming process. By contrast to the present invention, competitive products and prior art known provides flooring formed of metal, such as steel or aluminum or metal alloy to provide satisfactory strength and load support.

Alternatively, other suitable materials and methods of manufacturing may be used. By way of example, but not limitation, the assembly may include metal and/or composite reinforcement(s) encapsulated within a thermoformed thermoplastic 8, a fiber reinforced thermoplastic, or thermoset 9 or fiber-reinforced thermoset walking surface floor structure that is part of the truck bed assembly. The selection of materials and corresponding methods of making will depend upon the use of the assembly, the components, and requirements for each use.

In another embodiment of the present invention, other materials may be used as an alternative or addition to the thermoplastic materials as described hereinabove. By way of definition for this application, the thermoplastic polymer chains are linear, not cross-linked. TPO and Polypropylene copolymer are examples of a material suitable for the embodiments described herein. Other materials may be selected from a thermoplastic, a fiber reinforced thermoplastic, a thermoset 9 or a fiber-reinforced thermoset. Similarly, for the thermoforming process the following basic steps are included: at least one large plastic sheet is heated; pressure and/or vacuum are used to force the flexible plastic sheet against a tool surface for forming the shape of each component; and the final component thickness formed is typically about ½ to about ⅓rd the starting gauge thickness.

Figure 17:
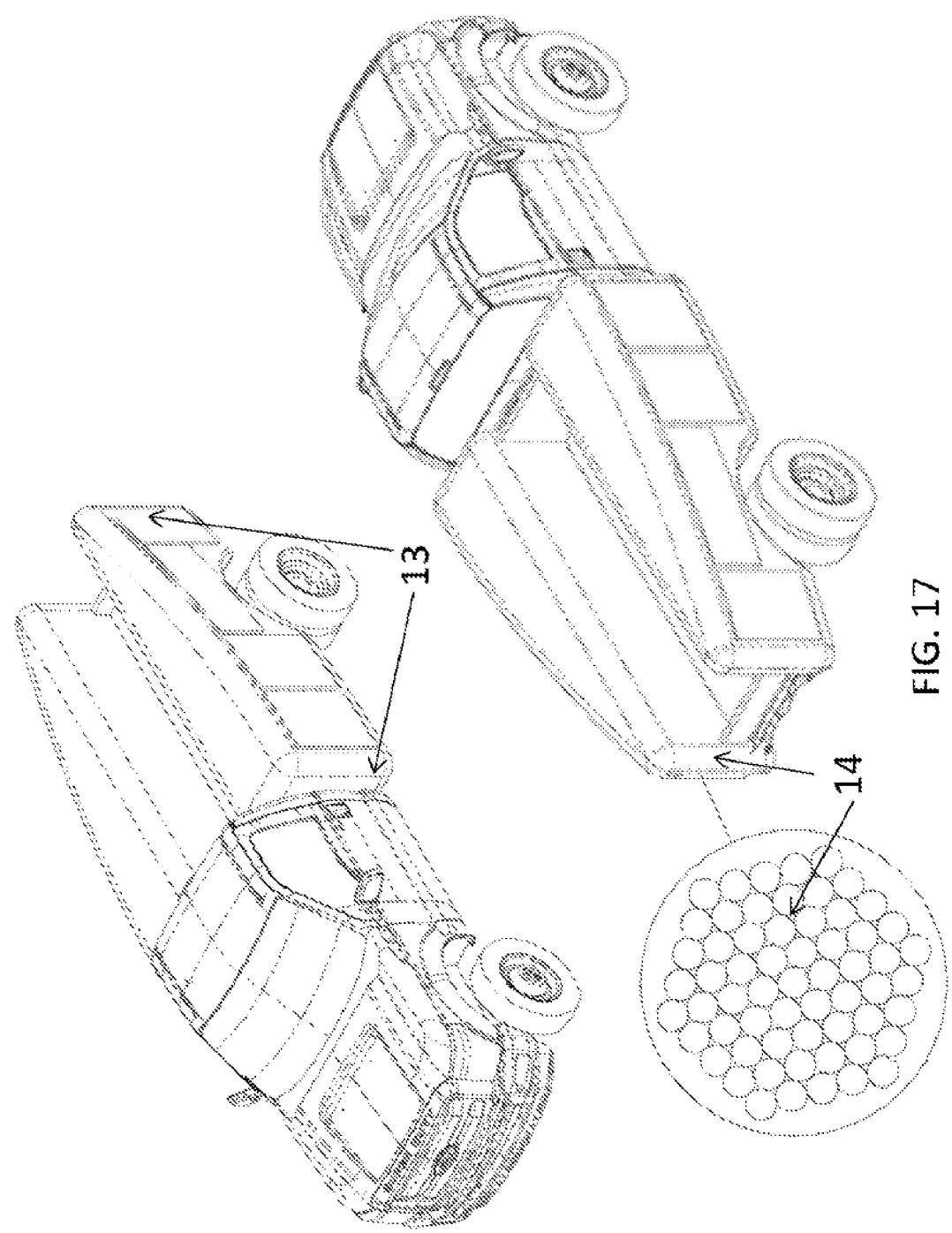
FIG. 17 is a diagram of a utility truck body with aerodynamic fairings.

Advantageously, as shown in FIG. 17, the preferred embodiments of the present invention provide for aerodynamic fairings 13 that reduce form drag and wind noise are either removably attached to the front of the sidepack(s), just behind the passenger cabin, or to the rear of the sidepack by mechanical fasteners, as set forth in the foregoing, or are permanently attached to the front of the sidepack(s), just behind the passenger cabin, or to the rear of the sidepack by welding or chemical bonds. Alternatively, the fairings 13 may be molded into the front area of the sidepack(s) or rear area of the sidepacks; no joining is necessary with this approach because the front or back of the sidepack(s) and the aerodynamic fairing 13 is provided as a single component creating an aerodynamic sidepack.

In preferred embodiments, the aerodynamic fairings are manufactured out of a thermoplastic olefin material that is formed to the desired, predetermined shape in a process of twin sheet thermoforming. In alternative embodiments, any suitable type of reinforced or unreinforced thermoplastic may be substituted for thermoplastic olefin in the construction of aerodynamic fairings. Furthermore, any type of thermoforming or other thermoplastic manufacturing process such as injection molding, rotational molding, etc. may be used to form the aerodynamic fairings. Also, in preferred embodiments, a slight curve is incorporated into the sidepack(s) to further reduce form drag and wind noise while the vehicle is operating or being driven. The curve may be any form that reduces drag and wind noise. A preferred embodiment of the curve is a taper, wherein the curve begins at the sidepack nearest the passenger cabin and tapers toward the rear of the sidepack.

Notably, the components recited in the present invention, including but not limited to the sidepack body including the sidepack doors, sidepack floor, and other sidepack components integral to the sidepack or attached to the sidepack, vehicle or truck body components including the truck bed floor, vehicle floor, vehicle or truck doors, the tailgate, truck toppers, shells, caps, tonneau covers, and any other component which is attachable to any part of a vehicle, elevating platforms or splicer platforms including platform doors, platform walls, and platform floors are operable to be constructed out of reinforced and/or unreinforced thermoplastics and/or thermosets, including filled and/or unfilled thermoplastics and/or thermosets. Alternatively, these components are operable to be manufactured out of nylon and/or fiberglass, including pultruded fiberglass. Additionally, the components are operable to be manufactured via any of the techniques recited herein, including any type of thermoforming process or other thermoplastic manufacturing process, such as injection molding, rotational molding, compression molding, compression molding using unidirectional tape, compression molding using sheet molding compound, compression molding using bulk molding compound, compression molding using thick molding, compression molding using wet molding, chop spray, gravity fed casting, low pressure casting, high pressure casting, resin transfer molding including light resin transfer molding, 3D printing, extrusion, Digital Light Synthesis (DLS) including Continuous Liquid Infusion Production, vacuum forming, infusion including vacuum infusion, hand layup, flex molding, lamination, squish molding, etc. Furthermore, the components of the present invention are operable to be manufactured integrally (i.e. manufactured at the same time or around the same time such that the components are integrally formed) or manufactured separately and then attached to other components or identical components via physical bonding, chemical bonding, mechanical attachment, mechanical interlocking, magnetism, reversible adhesive, irreversible adhesive, welding including plastic welding, and/or vacuum attachment.

Certain modifications and improvements will occur to those skilled in the art upon a reading of the foregoing description. By way of example and not limitation, one modification may include adding golf-ball-like dimples 14 to the fairings or body to increase skin friction drag and further reduce form drag and wind noise. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A sidepack assembly configured to be mounted to a truck bed, the sidepack assembly comprising:
   a sidepack floor comprising at least one thermoformed sheet, the at least one thermoformed sheet comprising at least one reinforcement component that is encapsulated by a thermoplastic material of the at least one thermoformed sheet; and
   at least one sidepack, the at least one sidepack comprising:
      at least one storage compartment; and
      a sidepack door configured to close the at least one storage compartment, the sidepack door comprising at least one thermoformed sheet.

2. The sidepack assembly of claim 1, further comprising:
   a waterproof interface comprising a seal configured to be disposed between the sidepack door and the at least one storage compartment.

3. The sidepack assembly of claim 1, wherein the sidepack floor further comprises a honeycomb core disposed on an internal surface of the at least one thermoformed sheet.

4. The sidepack assembly of claim 1, wherein the sidepack floor further comprises at least one thermoset sheet.

5. The sidepack assembly of claim 1, wherein the sidepack floor further comprises at least a second thermoformed sheet joined to the at least one thermoformed sheet at a plurality of kiss-off locations.

6. The sidepack assembly of claim 5, wherein the at least one thermoformed sheet and the second thermoformed sheet form a gap encapsulated therebetween.

7. The sidepack assembly of claim 1, wherein the sidepack floor is integral with a truck bed floor of the truck bed thereby forming a unitary assembly.

8. A sidepack assembly configured to be mounted to a truck bed, the sidepack assembly comprising:
   a sidepack floor comprising a first thermoplastic sheet, a second thermoplastic sheet, and at least one reinforcement structure disposed between the first thermoplastic sheet and the second thermoplastic sheet such that the at least one reinforcement structure is encapsulated between the first thermoplastic sheet and the second thermoplastic sheet; and
   at least one sidepack, the at least one sidepack comprising:
      at least one storage compartment; and
      a sidepack door configured to close the at least one storage compartment, the sidepack door comprising at least one thermoplastic sheet.

9. The sidepack assembly of claim 8, wherein the at least one reinforcement structure comprises a metal material.

10. The sidepack assembly of claim 8, wherein the at least one reinforcement structure comprises a composite material.

11. The sidepack assembly of claim 8, further comprising:
    a continuous fiber reinforcement disposed within at least one of the first thermoplastic sheet and the second thermoplastic sheet.

12. The sidepack assembly of claim 8, further comprising:
    a fiberglass core disposed between the first thermoplastic sheet and the second thermoplastic sheet.

13. The sidepack assembly of claim 8, further comprising:
    a polymer foam disposed between the first thermoplastic sheet and the second thermoplastic sheet.

14. A sidepack assembly configured to be mounted to a truck bed, the sidepack assembly comprising:
    a sidepack floor comprising a first thermoset sheet, a second thermoset sheet, and at least one reinforcement structure disposed between the first thermoset sheet and the second thermoset sheet such that the at least one reinforcement structure is encapsulated between the first thermoset sheet and the second thermoset sheet; and
    at least one sidepack, the at least one sidepack comprising:
       at least one storage compartment; and
       a sidepack door configured to close the at least one storage compartment, the sidepack door.

15. The sidepack assembly of claim 14, wherein a gap is formed between the first thermoset sheet and the second thermoset sheet.

16. The sidepack assembly of claim 15, further comprising:
    a foam core disposed within the gap.

17. The sidepack assembly of claim 15, further comprising:
    a honeycomb core disposed within the gap.

18. The sidepack assembly of claim 15, further comprising:
    a wood reinforcement structure disposed within the gap.

19. The sidepack assembly of claim 14, wherein the at least one storage compartment comprises a modular storage compartment that is re-configurable within a shell of the at least one sidepack.

20. The sidepack assembly of claim 14, wherein the at least one reinforcement structure comprises a metal material.

* * * * *